Aug. 25, 1936.                C. S. BRAGG                 2,051,816
                          STEERING MECHANISM
              Original Filed Dec. 7, 1931      4 Sheets-Sheet 1

INVENTOR.
Caleb S. Bragg
BY Jerome R. Cox
ATTORNEY.

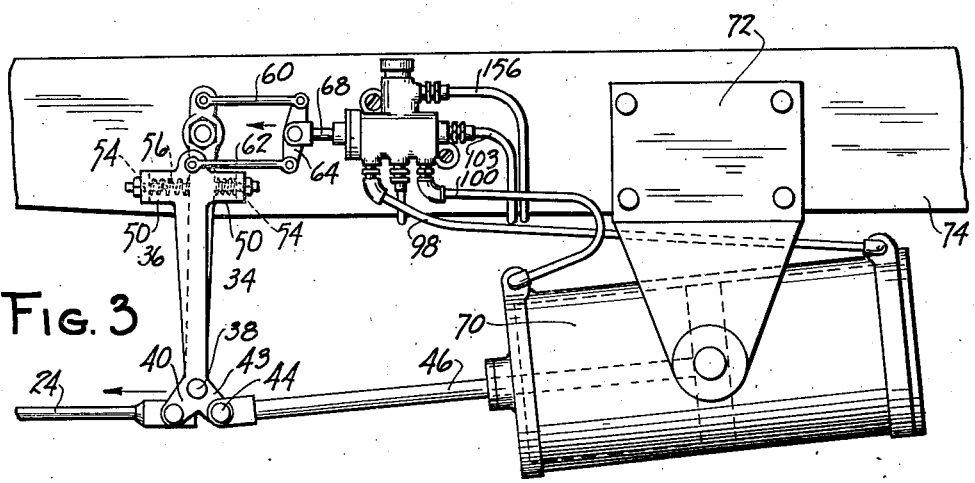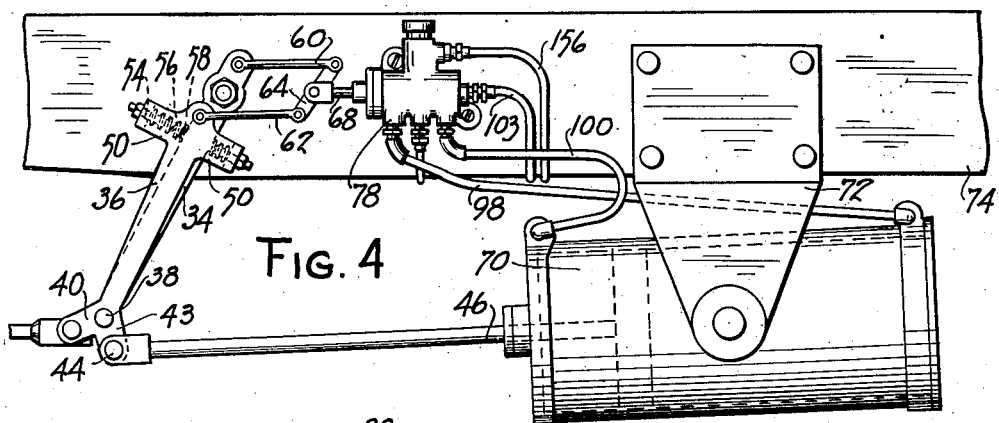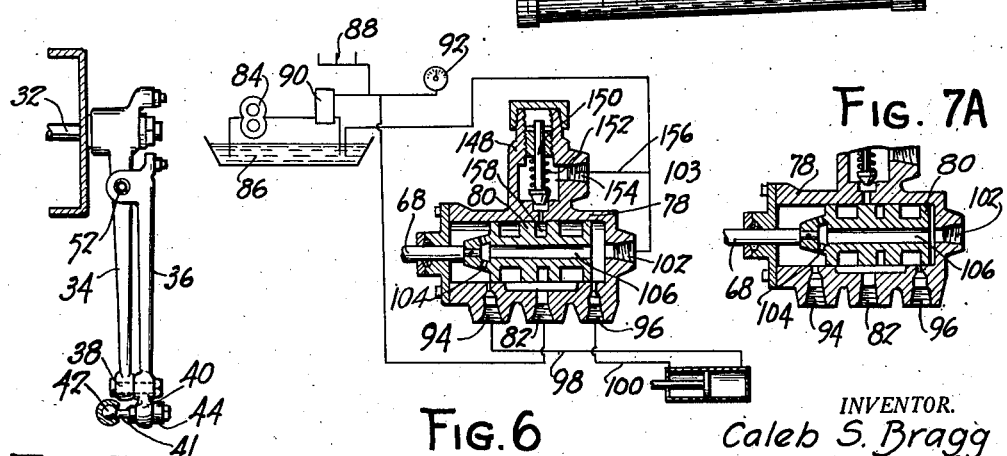

Aug. 25, 1936.  C. S. BRAGG  2,051,816
STEERING MECHANISM
Original Filed Dec. 7, 1931     4 Sheets-Sheet 3

INVENTOR.
Caleb S. Bragg
BY Jerome R. Cox
ATTORNEY

Aug. 25, 1936.   C. S. BRAGG   2,051,816
STEERING MECHANISM
Original Filed Dec. 7, 1931   4 Sheets-Sheet 4
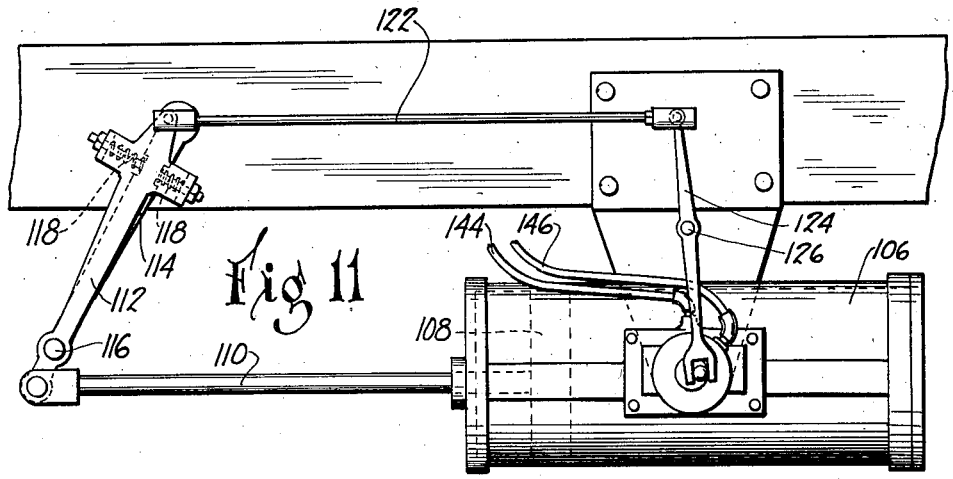
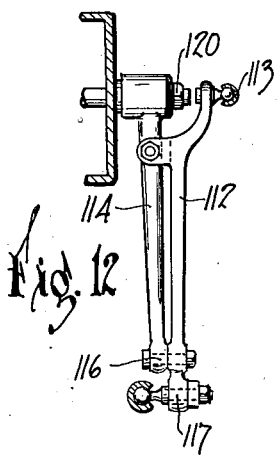
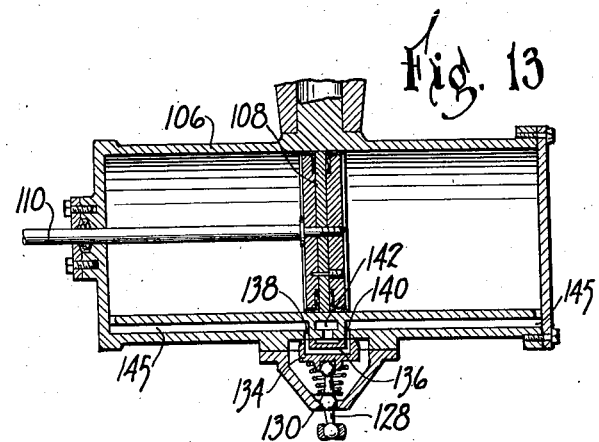
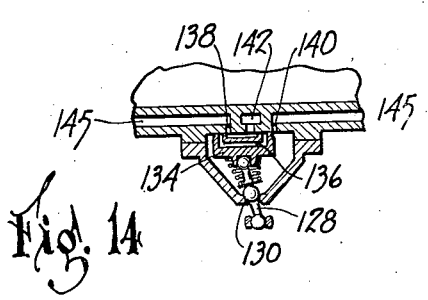
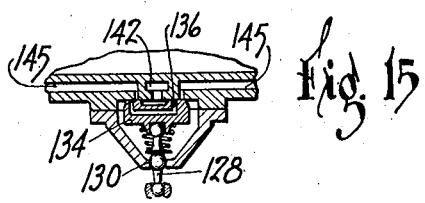
INVENTOR.
Caleb S. Bragg
BY Jerome R. Cox
ATTORNEY.

Patented Aug. 25, 1936

2,051,816

UNITED STATES PATENT OFFICE 2,051,816

STEERING MECHANISM

Caleb S. Bragg, Palm Beach, Fla., assignor to Bendix Aviation Corporation, South Bend, Ind., a corporation of Delaware Original application December 7, 1931, Serial No. 579,399. Divided and this application February 5, 1934, Serial No. 709,696

6 Claims. (Cl. 180—79.2)

This application is a division of my copending application Serial No. 579,399 filed December 7, 1931, which has matured into Patent No. 1,952,034, which has been reissued as Reissue 19,515.

This invention relates to steering mechanism, and more particularly to such mechanism applicable to automotive vehicles.

In the operation of automotive vehicles of the heavier types, such as large and powerful passenger cars, motor busses, motor trucks, and the like, the vehicles are steered ordinarily by turning a pair of wheels simultaneously by means of a hand-operated wheel controlled by the driver. When the vehicle is passing over a hard smooth roadway and proceeding in a substantially straight direction, the operation of this steering wheel or other manually controlled device does not ordinarily require the exertion of any considerable physical force on the part of the driver, but in making turns and sudden swerves, especially at slow speed, as in city traffic, the operation of such manually operated devices calls for the exertion of much greater force, even on substantially smooth roads, which in the operation of city busses, trucks, and the like, produces exhaustion after continuous driving. In the operation of the vehicle on the rutty or soft roads, or when as very frequently happens, the outer wheels of the vehicle are necessarily turned on to lateral portions of a roadway, which are rutty or soft, a very great amount of force is required for operating the steering mechanism correctly.

However, the steering effort required to determine the direction of the moving vehicle is, at worst, much less fatiguing than the effort required when the vehicle is at rest. Here, we introduce problems of static friction between the many movable parts of the steering mechanism as well as between the tires and the ground, and in general static friction is greater than the purely dynamic friction incurred during the motion of the vehicle; for example, with a vehicle parked against the curb it is usually vary difficult to turn the vehicle's wheels and with the vehicle mired in the mud the available physical strength to break the hold upon the wheels is usually completely inadequate.

The problem of steering when the vehicle is at rest is also aggravated by the increasing practice of carrying more of the pay load upon the front axle of the heavier vehicles, such, for example, as placing the driver's cab over the motor and so permitting the pay load to be carried several feet nearer the front axle. This practice results in increasing the steering effort beyond the physical strength and endurance of the operator within steering wheel ratios that are practical and safe.

An important object of my invention is, therefore, to provide, in connection with the ordinary steering mechanism of such automotive vehicles, or any automotive vehicle in which its use may be found advantageous or desirable, a power actuator for positively actuating the steering mechanism of the vehicle, even when the latter is at rest, and under the positive and delicate control of the operator through the ordinary steering wheel or other manually operated device.

It is a further object to so arrange the actuator with respect to the steering mechanism of the vehicle that the latter may be directly and entirely operated by the manually operated mechanism when the conditions are such as to require but a small amount of the physical effort of the driver to either effect the movement of the steering mechanism, or resist road shocks. The construction is such, however, that the power of the actuator may be instantly called into operative effect to supplant the aforementioned minimum of physical force exerted by the operator and to thereby relieve him from the labor of operating the steering mechanism whenever steering conditions become hard or whenever a great amount of power is required to be applied to the steering mechanism.

My invention also provides means whereby, whenever the actuator is furnishing its maximum power to effect a steering movement of the steering mechanism, the physical force exerted by the operator may be concurrently added to that exerted by the actuator, and further whereby, upon the entire failure of the actuator for any reason, the steering mechanism can nevertheless be manually controlled and operated in the usual manner.

In one arrangement of the aforementioned parts there is provided, in conjunction with the conventional drag link and its operating crank arm extending from the chassis side rail, a valve operating lever member pivotally connected to and supported on the crank arm. The lever member is preferably arranged, at one of its ends, to either operate or be operated by the drag link and/or a power actuator. The lever is further provided, adjacent its other end, with yieldable means contacting the aforementioned crank arm and at its extreme end with means for actuating the control valve of the actuator. The parts are so constructed and arranged that relative movement between the arm and lever, with the collapse of the yieldable means, serves to actuate the control valve to thereby energize the power actuator.

For the purpose of providing the necessary power for the actuator, I prefer to employ a force transmitting liquid, such as oil, for example, supplied from a suitable source under pressure. Practically all motors employed in the type of vehicles above referred to are internal combustion engines, and are provided with a forced feed lubricating system including an oil pump, which pumps the oil continually under a comparatively high pressure, substantially 30 pounds or upwards, through circulating pipes to the various bearings of the engine, from which the oil finds its way back to a sump or reservoir and is used over and over again. In order to maintain an adequate supply of oil under pressure for lubricating the various bearings, under all conditions of the oil, which becomes thin when heated or from use, and under all conditions of the bearing surfaces, which when worn permit a greater amount of oil to pass through them, it is customary to supply a pump of far greater capacity than normally needed. In conjunction with such a pump it is also customary to insert, in the pressure line from the pump, a by-pass leading back to the sump or reservoir controlled by a pressure regulating valve, which will maintain a desired maximum pressure in the circulating lubricating system by opening sufficiently to by-pass the excess oil back to the reservoir or sump.

This valve is ordinarily of the adjustable spring loaded ball type, and in order to provide sufficient lift to the valve to permit a large volume of oil to pass when the motor is running at high speed and to prevent the motor from smoking when idling the ball is ordinarily slightly unseated at minimum pump pressures. This leakage obviously reduces the minimum pressure, which pressure is obtained during the idling of the engine; however, it is during the lower engine speeds that the greatest demands are placed upon the steering mechanism. This is particularly true with the vehicle parked or mired as heretofore described.

We are, therefore, confronted with the problem of normally having an insufficiency of oil pressure at the very time when it is desired to effectively operate the power actuator.

It is, therefore, one of the principal objects of the invention to step-up the idling motor oil pressure, and to this end there is suggested the retention of the aforementioned conventional pressure regulating valve and the addition of a secondary or auxiliary pressure regulating valve cooperating therewith as described below.

According to my invention the conventional valve is left intact in the system but is sufficiently loaded to obviate rupture of the lubricated engine parts and functions as such only during the operation of the power actuator. At all other times, that is with the actuator inoperative, the auxiliary valve referred to functions as the normal maximum pressure regulating valve of the engine, serving in the place of the aforementioned usual engine valve, and is furthermore arranged to be automatically closed off or isolated from the system when and if the power actuator is rendered operable. Such an arrangement of parts insures, when and if the actuator is brought into operation, an increased operating engine oil pressure over and above that obtained by the conventional setting for the idling engine. The increased operating pressure permits the employment of a smaller actuating cylinder, reducing the time required to effect the power steering.

One suggested arrangement contemplates the mounting of the aforementioned auxiliary valve in series with the control valve for the actuator, with the latter in its neutral position, which position is such as to maintain the actuator inoperative and at the same time place the auxiliary valve in direct communication with the engine lubricating system. The parts are furthermore so arranged that operation of the control valve, which is preferably of the slide type, serves to cut-out the auxiliary valve and thereby automatically throw the entire burden of relieving the system of excess pressure upon the "stepped-up" main or conventional regulating valve.

The invention in its broadest aspect, therefore, contemplates the employment of the force feed lubricating system of the engine, modified to permit an increase of the minimum pressure of said system, as a source of power for actuation of a power actuator or servo motor, the latter being rendered operative, and the lubricating system being modified, through the instrumentality of a manually operated control valve, to actuate the steering mechanism of an automotive vehicle.

Other objects of the invention and meritorious advantages thereof will become apparent from a reading of the detail description to follow taken in connection with the accompanying drawings, in which:

Figure 1 discloses, diagrammatically, conventional parts of an automotive vehicle together with my invention incorporated therein;

Figure 2 discloses, in side elevation, the most essential parts of the invention in cooperation with the drag link of the conventional steering mechanism;

Figure 3 discloses the elements of Figure 2 just after the valve is cracked;

Figure 4 discloses the same parts during the operation of the power actuator;

Figure 5 is a detail sectional view taken on line 5—5 of Figure 2;

Figure 6 is a detail sectional view of the actuator control valve and pressure regulating valve cooperating therewith together with a schematic view of the engine lubricating system;

Figures 7 and 7a are detail sectional views of the control valve during its operation;

Figures 9, 10, 11 and 12 are views similar to Figures 2 to 5, inclusive, disclosing the features of the modification;

Figure 13 is a sectional view of the modified form of actuator and is taken on line 13—13 of Figure 9; and Figures 14 and 15 disclose, in section, details of the control valve in its cracked and lapped positions.

Figure 1:
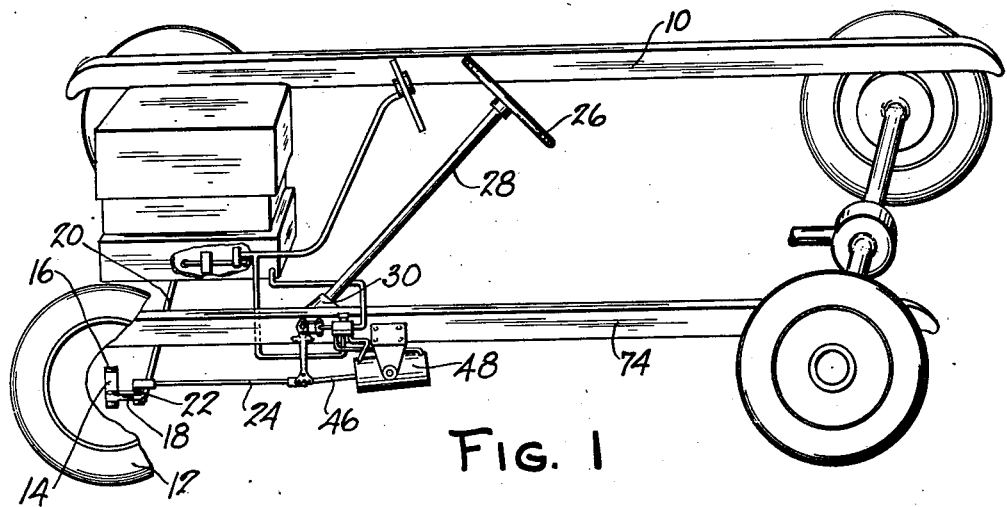

In the accompanying drawings, 10 represents the chassis of an automotive vehicle, which may be of any usual or desired construction and is provided with steering wheels indicated at 12. In connection with these steering wheels I have shown the ordinary manner of mounting and connecting the same for joint actuation, although it is to be understood that my invention is applicable to any form of steering mechanism. In the present instance the wheels are mounted on stub axles 14 forming with their bearings 16 the usual steering knuckles, each axle being provided with a steering arm 18 and said arms being connected by a tie rod 20 in the usual manner. One of the axles is provided with the usual steering lever 22 to which the usual drag link 24 is connected in any preferred manner. For the purpose of securing the manual control of the steering mechanism, either with or without the assistance of the actuator hereinafter described, I have shown the usual steering wheel 26 secured to the upper end of a steering shaft 28 provided on its lower end with a conventional worm and worm segment construction 30 coöperating to rotate the shaft 32, Figure 5, the latter being provided with a downwardly extending arm 34. The arm 34 is interconnected with the drag link, the piston of a power actuator and with a valve mechanism therefor, all as more clearly described hereinafter, and in such manner that the steering mechanism can be operated either with or without the assistance of the actuator by turning the steering wheel 26.

To this end the arm 34 is provided with a lever member 36 pivotally mounted thereon at 38. The lever 36 is preferably forked at its lower end, one arm 40 being provided with a stub shaft 41 pivotally connected at 42 to one end of the drag link and the remaining arm 43 is pivotally connected at 44 to the operating or connecting rod 46 of a power actuator generally indicated at 48, Figure 1. At its upper end the lever is provided with laterally extending projections 50 provided at their outer ends with inwardly extending ears 52 having threaded openings receiving adjustable stops 54 contactible at their inner ends with stops 56 projecting from the arm 34. Compression springs 58 may be interposed between the ears 52 and arm, the same being guided upon the aforementioned stops 54 and 56. Links 60 and 62 are pivotally connected at one of their ends to the ends of the arm and lever, respectively, and at their remaining ends to a bar 64 pivotally connected, at its center, to a link 68 connected to and adapted to actuate a valve mechanism for the power actuator, which mechanism will be described in greater detail hereinafter. The particular arrangement of the links as described obviates movement of the rod 68 with the arm and lever moving as a unit.

Figure 2:
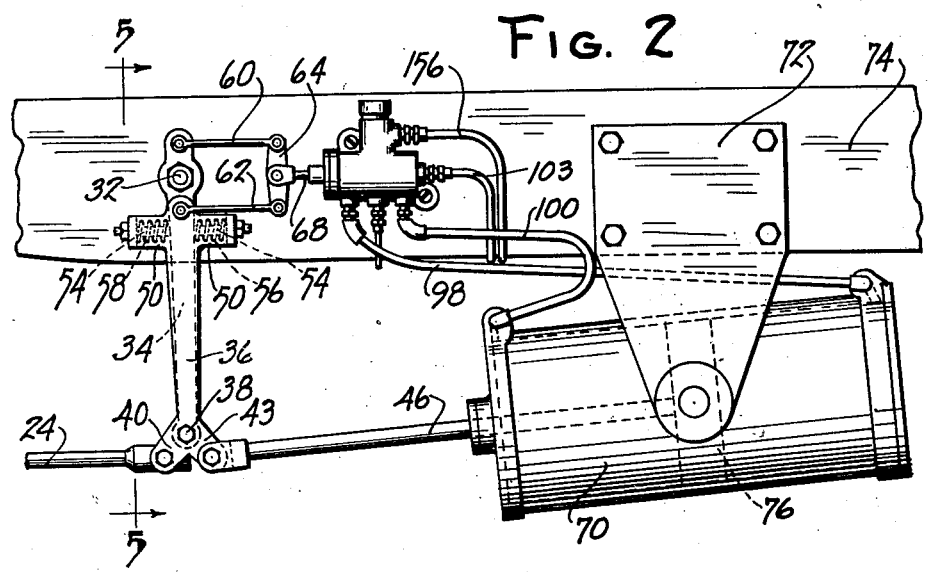

With the parts in their inoperative position as disclosed in Figure 2, the springs 58 are sufficiently strong to maintain the lever 36 in alignment with the arm 34 and thereby maintain the valve in its neutral position; when compressed to their full extent, however, the springs permit stops 54 and 56 to contact, at once obviating further and harmful movement of the valve mechanism and also providing for a direct manual application of the steering mechanism.

From the description of the parts thus far given, it will be seen that when the hand wheel 26 is turned in one direction or the other the arm 34 will be moved either forwardly or rearwardly, as the case may be, and that if the resistance of the steering mechanism is not sufficient to cause the compression of the springs 58, according to the direction in which the arm 34 moves, the arm and lever will move as a unit and the steering mechanism will operate under the manual control of the operator, exactly as any ordinary steering mechanism operates.

Passing now to a description of the power actuator and its control valve, 70 represents a double-ended actuator cylinder which is pivotally supported on its opposite sides by brackets 72 secured to the chassis side rail 74. Such a mounting permits the actuator piston 76 and its rod 46 to be connected directly to the drag link in alignment with the axis of its pivotal connection with the lever 36, thereby obviating universal joints or equivalent construction. The relative movement of the interconnected parts during the operation of the power mechanism as well as during the movement of the vehicle is thus compensated for.

Figure 7:
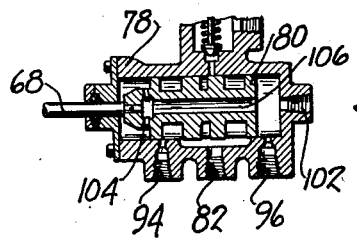
Figure 8:
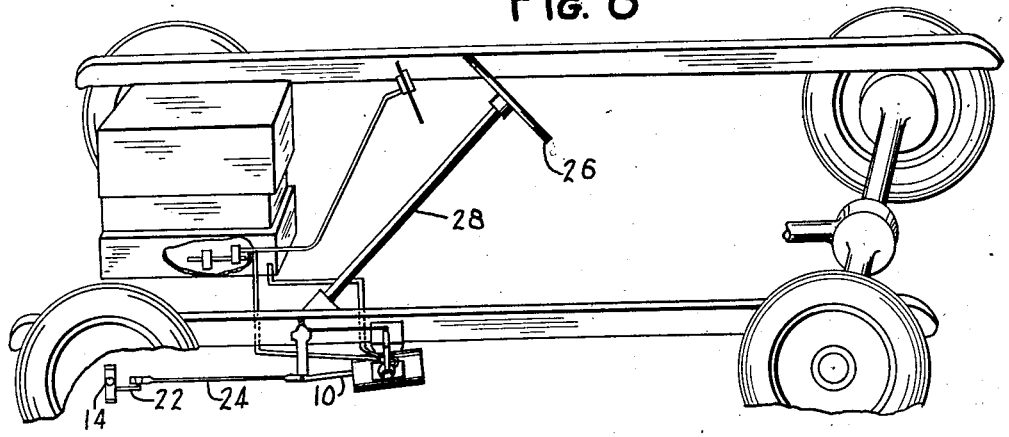
Figure 8 is a view similar to Figure 1 disclosing a modification of my invention.
Figure 9:
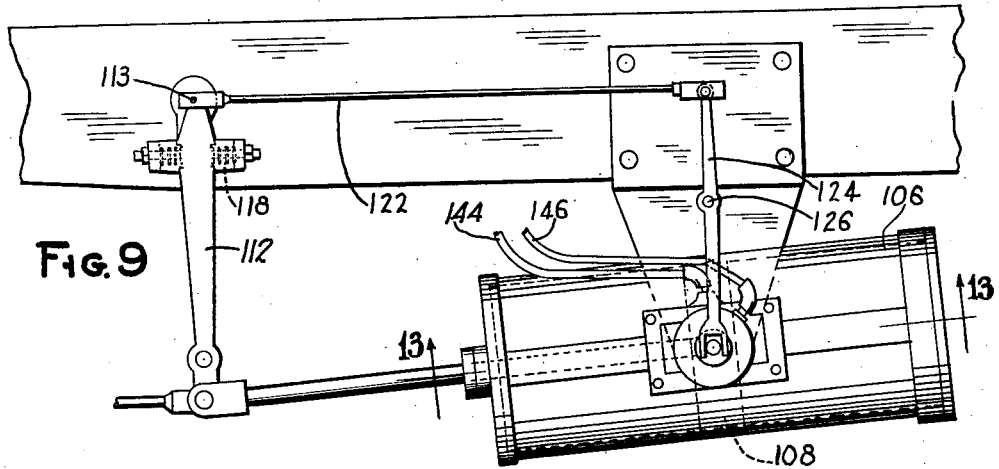

The valve mechanism for controlling the operation of the actuator is disclosed in detail in Figures 6 and 7 and preferably comprises a casing 78, rigidly secured to the chassis, and housing a slidable piston member 80 connected by rod 68 to the bar 64 as heretofore described. The valve parts are shown in the "off" or neutral position in Figure 6. Movement of the crank arm 34 clockwise as disclosed in Figure 3 to effect "left" steering causes a relative movement between the arm 34 and lever 36, the latter fulcruming on the drag link 24 at 42. This movement, however, presupposes sufficient resistance to movement of the steering mechanism to collapse the spring 58, all as heretofore described, and clearly disclosed in Figure 3. The aforementioned relative movement of the arm and lever causes a differential movement of the links 60 and 62 to move the link 68 to the left, Figure 3, and crack the valve to energize the actuator in the manner more fully described hereinafter.

The power fluid for energizing the actuator is preferably derived from the force feed lubricating system of the engine, and to this end an inlet port 82 in the valve is placed in continuous circuit with the oiling system of the engine, shown diagrammatically in Figure 6. This system preferably comprises a conventional pump 84 continuously forcing oil, from sump 86 and under pressure, to the engine parts 88, the conventional pressure regulating valve 90 and indicating gauge 92 being placed in the circuit.

The actuator control valve member, when thus rendered operative to effect the steering operation, intercommunicates port 82 in the valve casing with port 94, Figure 7, which port is connected to the right end of the actuator by flexible conduit 98. The liquid under pressure will immediately act to force piston 76 to the left with the consequent actuation of the steering mechanism, all as clearly disclosed in Figure 4. The liquid forced from the actuator during this working stroke of the piston will be returned to the sump via conduit 100, ports 96 and 102 in the valve casing and conduit 103.

The movement of the piston, during the operation of the steering mechanism by power, will follow the movement of the hand wheel 26 so long as the latter is turned with sufficient force to keep the lever spring 58 compressed and the valve cracked. If the force from the piston is inadequate to move the wheels, or move them fast enough, the physical effort of the operator may be added to that of the piston, the lever 36 and arm 34 acting as a unit under such physical force, the position of the parts, considering this phase of the operation, also being disclosed in Figure 4. As clearly disclosed, the operation is double-acting or reversible, and once the wheels have been turned to their new position it is merely necessary to reverse the direction of movement of the hand wheel, as with manual steering, to obtain a power return of the mechanism to the straight ahead position of the wheels. The position of the valve parts, during the power steering of the wheels to the right, is disclosed in detail in Figure 7a, the pressure fluid passing out through port 96 and returned to the sump via ports 94, 104 and duct 106 in the valve. In the neutral position of the valve the ends of the cylinder are connected with each other and with the sump, so there is no resistance to the movement of the piston by manual steering, the oil moving from one end of the cylinder to the other.

There is disclosed in Figures 8 to 15, inclusive, a modified form of power actuator and valve mechanism. This structure comprises a double-ended cylinder 106 having a piston 108 connected by rod 110 to the lower end of a valve actuating lever 112. Lever 112 is pivoted to arm 114 at 116 and is also provided with the operating springs 118 and other cooperating lever structure as previously described. Lever 112 is pivotally connected at 113 in coaxial alignment with the pivot 120 of arm 114, to valve operating rod 122, the latter being universally connected to a lever 124 fulcrumed at 126 on the supports for the actuator cylinder. By positioning the pivot 113 opposite pivot 120 unitary movement of the arm 114 and lever 112 has no effect on the valve mechanism.

Lever 124 is recessed at its end to house the ball end of a lever member 128 pivotally mounted at 130 upon a valve housing 132 extending from the cylinder 106. Lever 128 is arranged to impart oscillatory movement to a slide valve member 134 provided with a duct 136 registering, in the neutral or "off" position, with ducts 138 and 140 in the side wall of the actuator, Figure 13.

Figure 10:
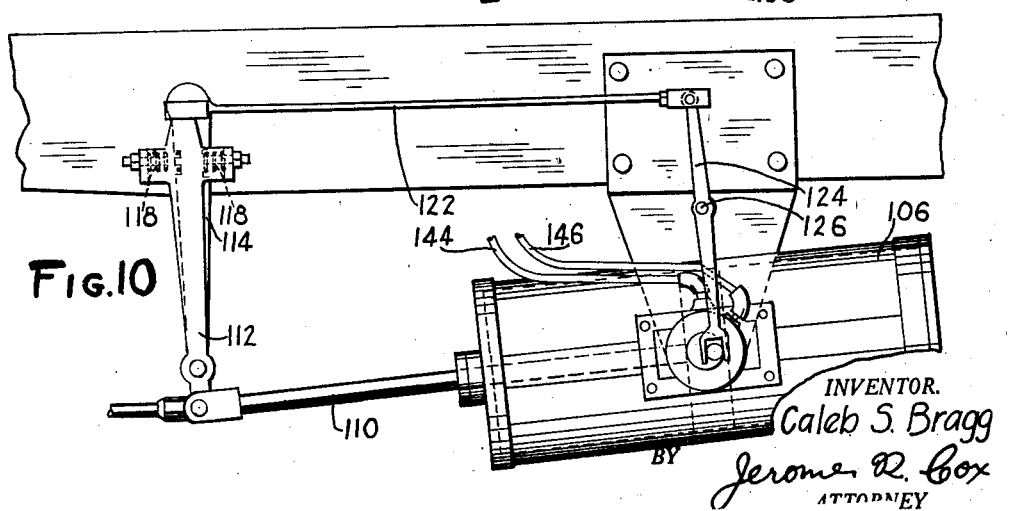

Movement of the arm 114 to rotate the lever 112, Figure 10, serves to "crack" the valve by registering either of ducts 138 or 140 with an inlet port 142 in the actuator in communication with the aforementioned lubricating system of the engine by means of flexible conduit 144 and with one or the other of ducts 145 in the actuator. Figure 14 discloses the valve in its cracked position.

The piston is thus moved, Figure 11, under the pressure derived from the engine pump, to actuate the steering mechanism and/or resist road shocks, the liquid on the non-pressure side of the piston being forced back to the sump via one or the other of ducts 138 or 140 into the valve and thence through conduit 146. If movement of the hand wheel is stopped, the continued movement of the piston 108 will cause relative movement between the arm 112 and lever 114 to "lap" the valve mechanism as disclosed in Figure 15, both of ports 138 and 140 in the valve mechanism being blanked by the slide valve. The piston, together with its connected steering mechanism, is thus held rigidly in position until the hand wheel is again moved to recrack the valve. As with the first described embodiment, the actuator is double-acting, facilitating the control and simulating conventional manual operation of the steering mechanism, and offers no resistance to manual steering. This construction reduces lost motion to a minimum, as the distance between point 113, Figure 2, on lever 112 and fulcrum point 116 is eight times the distance between point 117 and fulcrum point 116. One quarter inch movement to operate valve at 113 is only one thirty-second inch at 117 on the steering arm.

A collateral, but major feature, of my invention relates to means for "stepping-up" the minimum or idling pressure of the conventional engine lubricating system. In such a system, in order to maintain an adequate supply of oil under pressure for lubricating the various bearings, it is customary to maintain the pump 84 at a capacity far greater than normally needed, the excess oil being returned to the sump under the control of the pressure regulating valve. This valve is ordinarily of the adjustable spring loaded ball type generally similar to the valve 148 disclosed in Figure 6, and in order to provide sufficient lift to the valve to permit a large volume of oil to pass when the motor is running at high speed and to prevent smoking while idling, the ball is ordinarily unseated at pressures considerably below maximum. This leakage obviously reduces the minimum pressure, which pressure is obtained during the idling of the engine; however, it is during the lower engine speeds that the greatest demands are placed upon the steering mechanism. This is particularly true with the vehicle parked or mired as heretofore described.

There is thus an insufficiency of oil pressure at the very time when it is desired to effectively operate the power actuator.

This defect is overcome, in the suggested construction, by abnormally spring loading the valve member in the valve 90 which latter valve structure is a duplicate of the valve 148 of Figure 6. The loading is such as to insure a seating of the valve member 150, with the engine idling, and is also such as to permit operation of the valve to obviate rupture of the system at abnormal pressures, but only functioning when and if the actuator is brought into play as more clearly described hereinafter. Cooperating with the valve 90 there is provided the aforementioned valve 148, preferably mounted on the control valve of the actuator. This valve comprises the aforementioned poppet member 150 urged into engagement with its seat, by a spring 152, the valve casing being provided with a port 154 intercommunicating with the sump via conduits 156 and 103. With the actuator control valve in neutral or "off" position a bore 158 therein communicates with the regulating valve 148, and in this position the valve functions as the normal regulating valve of the engine lubricating system, the spring 152 being set to limit the pressure of the system to the maximum desired for satisfactory and economical lubrication.

As a further feature of the invention, the valve 148 is so positioned with respect to the actuator control valve that opening of the latter serves to cut-off or isolate the valve 148 as clearly disclosed in Figures 7 and 7a. Such operation immediately throws the entire burden of relieving the lubricating system of excess pressure upon the valve 90, which, however, has been "stepped-up" as described. The minimum oil pressure is thus increased permitting a more effective operation of the actuator during the idling of the engine. Such a pressure permits a reduction in size of the actuator piston with its attendant advantages.

My invention, therefore, provides a very flexible and easily controlled steering arrangement which can be very readily attached to the normal steering mechanism of automotive vehicles of any kind without making any radical changes therein, and by the use of which the operator can exercise the fullest control of the steering wheels (1) under conditions which oppose only a slight resistance to the steering movement; (2) by power alone; (3) concurrently by physical effort and by the power actuator; (4) exclusively by physical effort upon the event of total failure of power; and (5) with a minimum of lost motion at steering wheel.

It is to be understood that while the illustrated embodiments of the invention are described as shown, a considerable latitude is to be provided in construction within the range of the appended claims.

I claim:

1. In an automotive vehicle provided with an engine forced feed lubricating system and a steering gear, a power actuator for operating said steering gear, a control valve for said actuator, safety and pressure regulating valves in said lubricating system, connections interconnecting said steering gear and control valve, and means including said connections whereby manual operation of the steering gear renders the actuator control valve operative and renders one of the pressure regulating valves inoperative.

2. In an automotive steering mechanism including a power actuator and a control valve therefor, a drag link, a pivoted steering arm, manually operable means for actuating said arm and means for operating said control valve, said latter means adapted to transmit the power of said actuator to the drag link, said means comprising a link pivotally mounted, adjacent one of its ends, upon one end of said steering arm, said link being of forked construction at one of its ends, connections between the forked end of said link and said actuator and drag link and other connections between the other end of the link and said control valve, said latter connections including a bar member pivotally connected at its center to the control valve and spaced parallel links each connected at one of its ends to one end of said bar and each connected at its remaining end to the ends of the link and arm respectively.

3. For use with an automotive vehicle, a steering system comprising a power actuator, a control therefor, a main arm, a pivot therefor, an auxiliary arm pivoted on the main arm and adapted at times to move as a unit with the main arm and at times to move about its pivot relative thereto, and means operated by relative movement of the arms but non-operative when the arms move as a unit for actuating said power actuator control, comprising a slidable rod connected to both of said arms and to said actuator control and aligned with said pivot.

4. For use with an automotive vehicle, a steering system comprising a power actuator, a control therefor, a main arm, a pivot therefor, an auxiliary arm pivoted on the main arm and adapted at times to move as a unit with the main arm and at times to move about its pivot relative thereto, means operated by relative movement of the arms but non-operative when the arms move as a unit for actuating said power actuator control, said last named means comprising a link connected to one arm, a second link connected to the other arm at a point equidistant from said pivot, and a cross bar pivotally connected to both of said links and to said actuator control.

5. In a hydraulic automotive steering mechanism for a vehicle having a motor, a drag link, a pivoted steering arm, a power cylinder, means for manually operating said steering arm, a valve for controlling the operation of said power actuator, a relief valve, means for operating said control valve, means whereby operation of said control valve renders said relief valve ineffective, and means for creating fluid pressure for actuating said power actuator and for lubricating the motor.

6. In a hydraulic automotive steering mechanism for a vehicle having a motor, a drag link, a pivoted steering arm, a double ended power cylinder, an auxiliary arm pivotally mounted on said steering arm, means for manually operating said steering arm, a valve for controlling the operation of said power actuator, a relief valve, means connecting said auxiliary arm with said drag link, means connecting said auxiliary arm with said power actuator, means connecting said auxiliary arm and said steering arm with said control valve whereby relative movement between said arms operates said control valve, means whereby operation of said control valve renders said relief valve ineffective, and means for creating fluid pressure for actuating said power actuator and for lubricating the motor.

CALEB S. BRAGG.